United States Patent
Feilen et al.

(10) Patent No.: US 7,565,552 B2
(45) Date of Patent: Jul. 21, 2009

(54) METHOD FOR PROTECTING AGAINST MANIPULATION OF A CONTROLLER FOR AT LEAST ONE MOTOR VEHICLE COMPONENT AND CONTROLLER

(76) Inventors: Oliver Feilen, Ottersrieder Str. 20, Rohrbach (DE) D-85296; Rudiger Stadtmuller, Josef-Fleischmann-Str. 15A, Ingolstadt/Etting (DE) D-85055

( * ) Notice: Subject to any disclaimer, the term of this patent is extended or adjusted under 35 U.S.C. 154(b) by 192 days.

(21) Appl. No.: 10/525,213

(22) PCT Filed: Jul. 23, 2003

(86) PCT No.: PCT/EP03/08022

§ 371 (c)(1),
(2), (4) Date: Oct. 12, 2005

(87) PCT Pub. No.: WO2004/027586

PCT Pub. Date: Apr. 1, 2004

(65) Prior Publication Data
US 2006/0143472 A1  Jun. 29, 2006

(30) Foreign Application Priority Data
Aug. 21, 2002  (DE) .............................. 102 38 095

(51) Int. Cl.
*H04L 9/32*  (2006.01)
*H04L 9/00*  (2006.01)
*G06F 11/30*  (2006.01)

(52) U.S. Cl. .................... 713/189; 713/190; 713/191; 713/192; 713/193; 713/194; 380/28; 380/29; 726/34; 726/35

(58) Field of Classification Search ............... 713/189
See application file for complete search history.

(56) References Cited

U.S. PATENT DOCUMENTS

| | | | | |
|---|---|---|---|---|
| 5,892,906 A * | 4/1999 | Chou et al. | ................... | 726/19 |
| 6,378,072 B1 | 4/2002 | Collins et al. | | |
| 6,526,171 B1 * | 2/2003 | Furukawa | ................... | 382/232 |
| 7,028,014 B1 * | 4/2006 | Naclerio | ................... | 705/401 |
| 7,055,029 B2 * | 5/2006 | Collins et al. | ............... | 713/161 |
| 7,111,167 B1 * | 9/2006 | Yeung et al. | ................ | 713/176 |
| 7,137,001 B2 * | 11/2006 | Dabbish et al. | ............ | 713/168 |

FOREIGN PATENT DOCUMENTS

| | | | |
|---|---|---|---|
| DE | 199 22 946 | | 5/1999 |
| DE | 100 01 986 | | 1/2000 |
| DE | 100 20 977 | | 4/2000 |
| JP | EP 1 197826 | * | 9/2000 |
| JP | EP 1 197 826 | | 4/2002 |

* cited by examiner

*Primary Examiner*—Longbit Chai

(57) ABSTRACT

The invention relates to a method for protecting against manipulation of a controller for at least one motor vehicle component, the control device (1) comprising at least one microcomputer (μC) and at least one memory module (2, 3), at least one of the memory modules (2, 3) constituting a reversible read-only memory (3), characterized in that the reversible read-only memory (3) stores data which have been encrypted by an encryption process, and the key used in the encryption process comprises at least one part of at least one original identifier (ID) of at least one of the modules (μC, 2, 3) of the control device, which identifier is specific to the module.

7 Claims, 4 Drawing Sheets

METHOD FOR PROTECTING AGAINST MANIPULATION OF A CONTROLLER FOR AT LEAST ONE MOTOR VEHICLE COMPONENT AND CONTROLLER

This application is a § 371 application of PCT/EP03/08204, which claims priority from DE 10238093.7.

BACKGROUND

This invention relates to a method for protecting against manipulation of a controller for at least one motor vehicle component, and a controller in which this process is implemented.

In motor vehicles, control devices, such as for example the engine control device or the transmission control device, are currently used to control individual motor vehicle components. The information which is required for operating these control devices, such as programs and data, are stored encrypted or unencrypted in memory modules ($E^2PROM$, flash and the like). The encryption process is independent of a fixed hardware combination of modules and is generally stored in a rewritable storage medium.

The disadvantage of these control devices and the programs used is that individual memory modules can be replaced or the data on the memory modules can be overwritten via a diagnosis interface or via direct access to the memory module. The replacement of a memory module or overwriting of the data and programs stored on this memory module can lead to the motor vehicle components operating with other characteristics. This is done for example in so-called chip tuning in which the memory modules which are assigned to the engine control device are replaced or the programs and data stored on these memory modules, such as characteristics, are changed. In this way, for example the output and/or the torque of the engine can be increased. If this manipulation is done without adapting the other motor vehicle components, such as the turbocharger, oil cooler, or brakes, damage to these motor vehicle components and safety-critical states can occur.

SUMMARY OF THE INVENTION

The object of this invention is therefore to devise a process for protection against manipulation of a control device in which replacement of a memory module and changing of the data on the memory module are not possible without affecting the operability of the control device or at least diagnosing the change and optionally displaying it.

The invention is based on the finding that this object can be achieved by using encryption of the data which are stored on a memory module, which encryption can be decrypted solely by the microcomputer which was originally assigned to the memory module.

The object is therefore attained by a process for protection against manipulation of a control device for at least one motor vehicle component, the control device comprising at least one microcomputer and at least one memory module, at least one of the memory modules constituting a reversible read-only memory, characterized in that the reversible read-only memory stores data which have been encrypted by an encryption process, and the key used in the encryption process comprises at least one part of at least one original identifier of at least one of the modules of the control device, the identifier being specific to the module.

By integrating at least one part of the specific identifier of at least one of the modules of the control device which were used originally in the control device, the expedient decryption can take place only from the microcomputer which was originally assigned to the memory module. Replacement of the reversible memory module which can constitute for example an EEPROM with the pertinent data is therefore not possible.

By preference the identifier which is used in the key for decryption of the data which are stored on the read-only memory constitutes the identifier of the microcomputer. By preference this identifier is the identification number which is issued when the microcomputer is manufactured and is stored in it.

In addition or as an alternative, the identifier however can also constitute the identifier of another memory module of the control device. Thus, for example the identification number of a flash memory which is connected to the microcomputer or which is integrated in it can be used as the identifier. As a result replacement of individual components of the control device is rendered even more difficult.

In order to prevent read-out of the key which comprises at least in part the original identifiers of at least part of the modules of the control device, the key can be stored in the RAM of the microcomputer. This embodiment is preferable especially when the key for decrypting the data which were stored encrypted in the reversible read-only memory is to be re-generated each time the control device is started up. This generation of the key allows additional security against replacement of individual components of the control device.

By preference at least one part of the identifier of at least one of the modules of the control device is read-out to generate a key for decrypting data on the reversible read-only memory from a read-protected OTP (one-time-programmable) area of the microcomputer which can be writeable only once.

BRIEF DESCRIPTION OF THE DRAWINGS

The invention will be described in greater detail below with the aid of possible embodiments illustrated in the attached drawings in which.

DETAILED DESCRIPTION OF THE INVENTION

Figure 1:
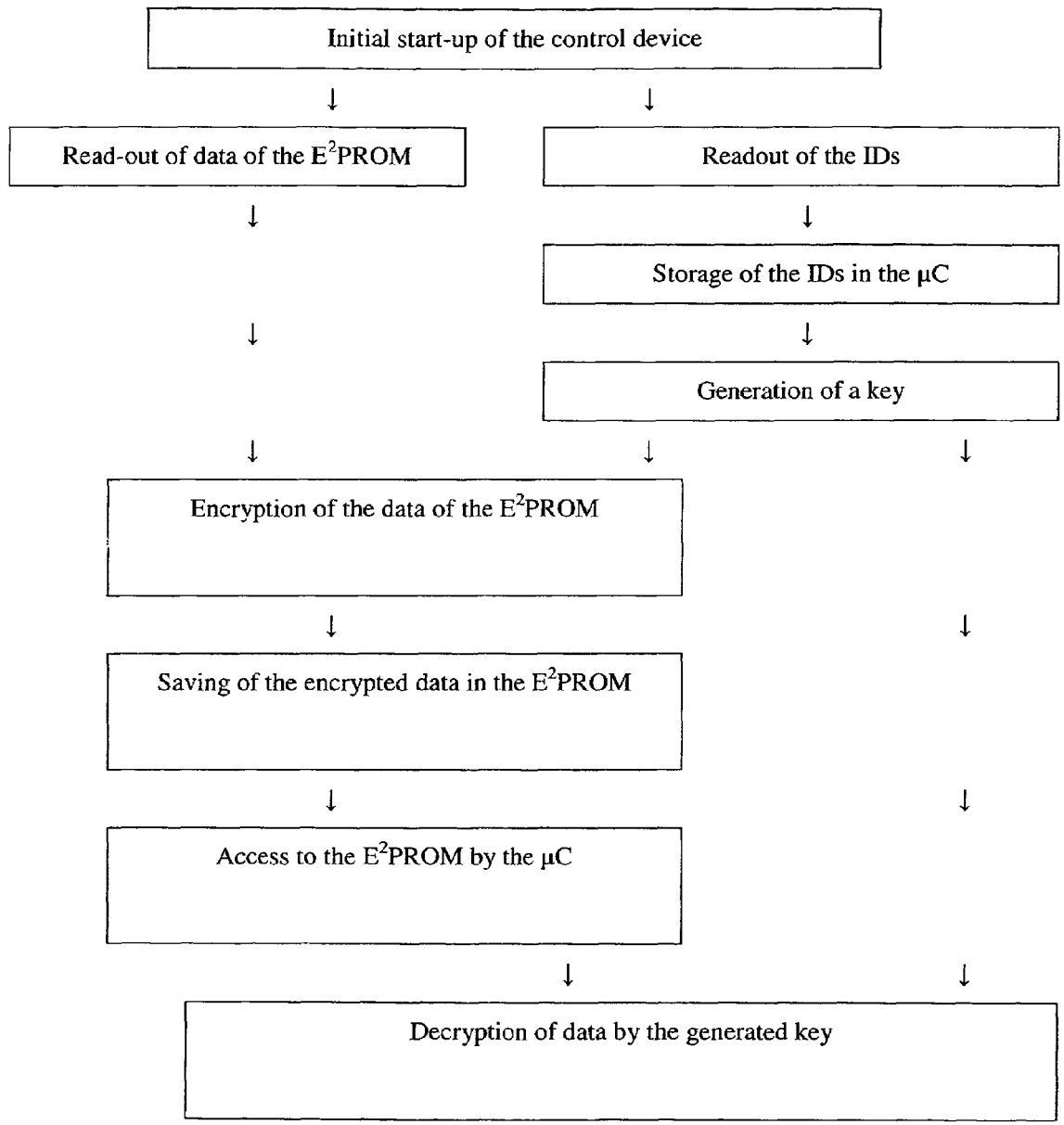
FIGS. 1 and 1$a$ show flow charts which schematically show the progression of the process as claimed in the invention.
Figure 1A:
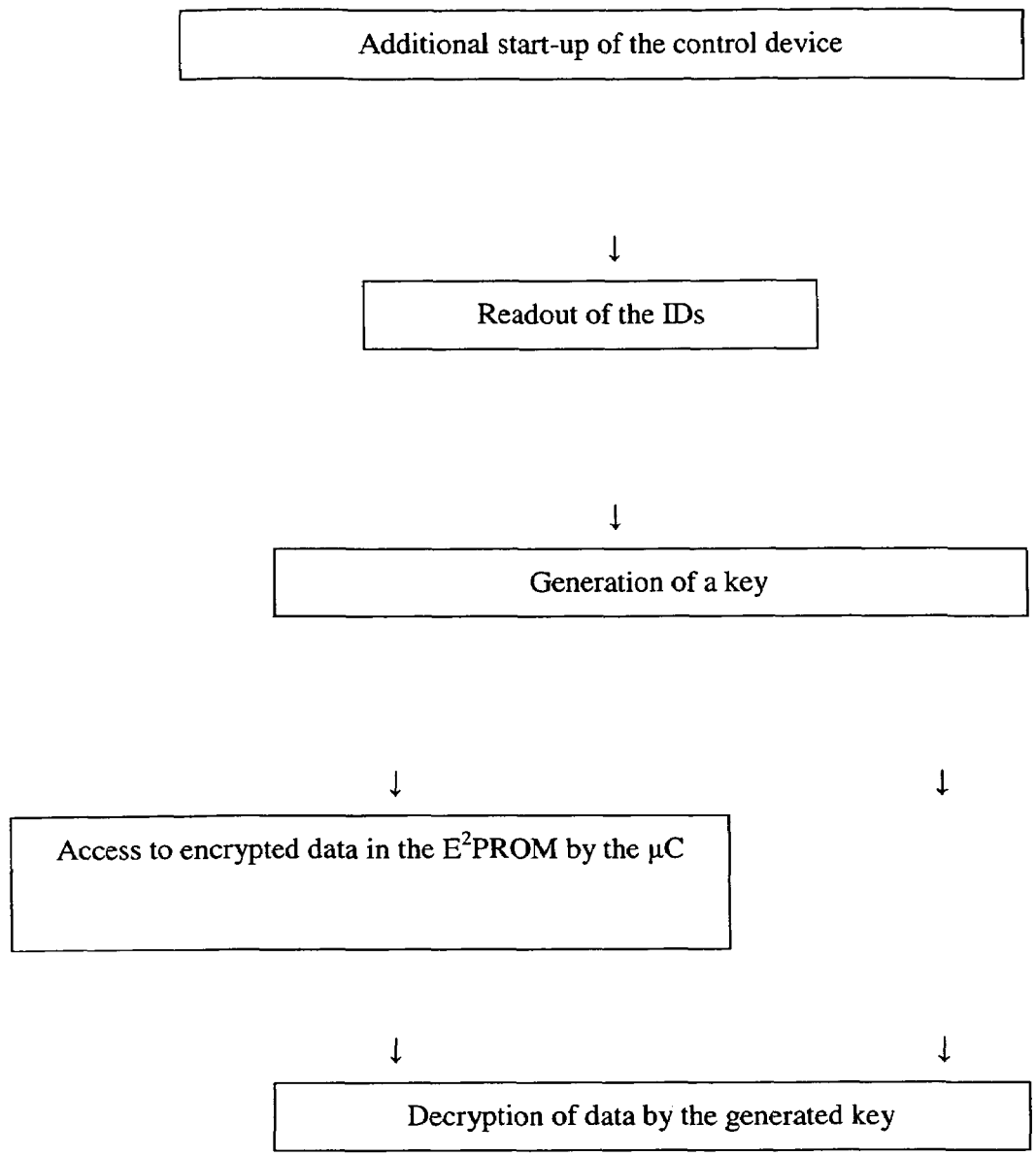

FIG. 1 schematically shows the progression of the process as claimed in the invention in a flow chart which will be explained below.

When a control device is started up for the first time, the data which are stored in the $E^2PROM$ which is assigned to the microcomputer or is integrated in it are read out. Identifiers such as for example the identification numbers of the microcomputer or additional memory modules are read out in parallel or staggered in time and a key is generated from them. By means of this key the data read out from the $E^2PROM$ are then encrypted and stored again in the $E^2PROM$ in this encrypted form. Subsequently, as soon as the microcomputer accesses the data of the $E^2PROM$, these data are decrypted by the originally generated key. In this way the control device can operate properly with the data stored in the $E^2PROM$, for example adaptation values and adjustment values for an engine control device.

With each additional activation and each activation of the control device which follows, at least one part of the identifiers of at least one module of the control device, such as for example of the microcomputer, is read out again and a key is generated from these identifiers or part of these identifiers. If subsequent access to the data which are stored in the E²PROM and which have been encrypted by means of the original key takes place, when the memory modules assigned to the microcomputer and the E²PROM are identical, the encrypted data are decrypted by the key which has been regenerated again and they can be used in the microcomputer to control the assigned motor vehicle components. If, conversely, one of the modules has been replaced, the key generated by the microcomputer for decryption does not agree with the encryption and the data stored on the E²PROM cannot be correctly accessed.

Additional embodiments of the process as claimed in the invention are described with reference to FIGS. 2 and 3.

Figure 2:
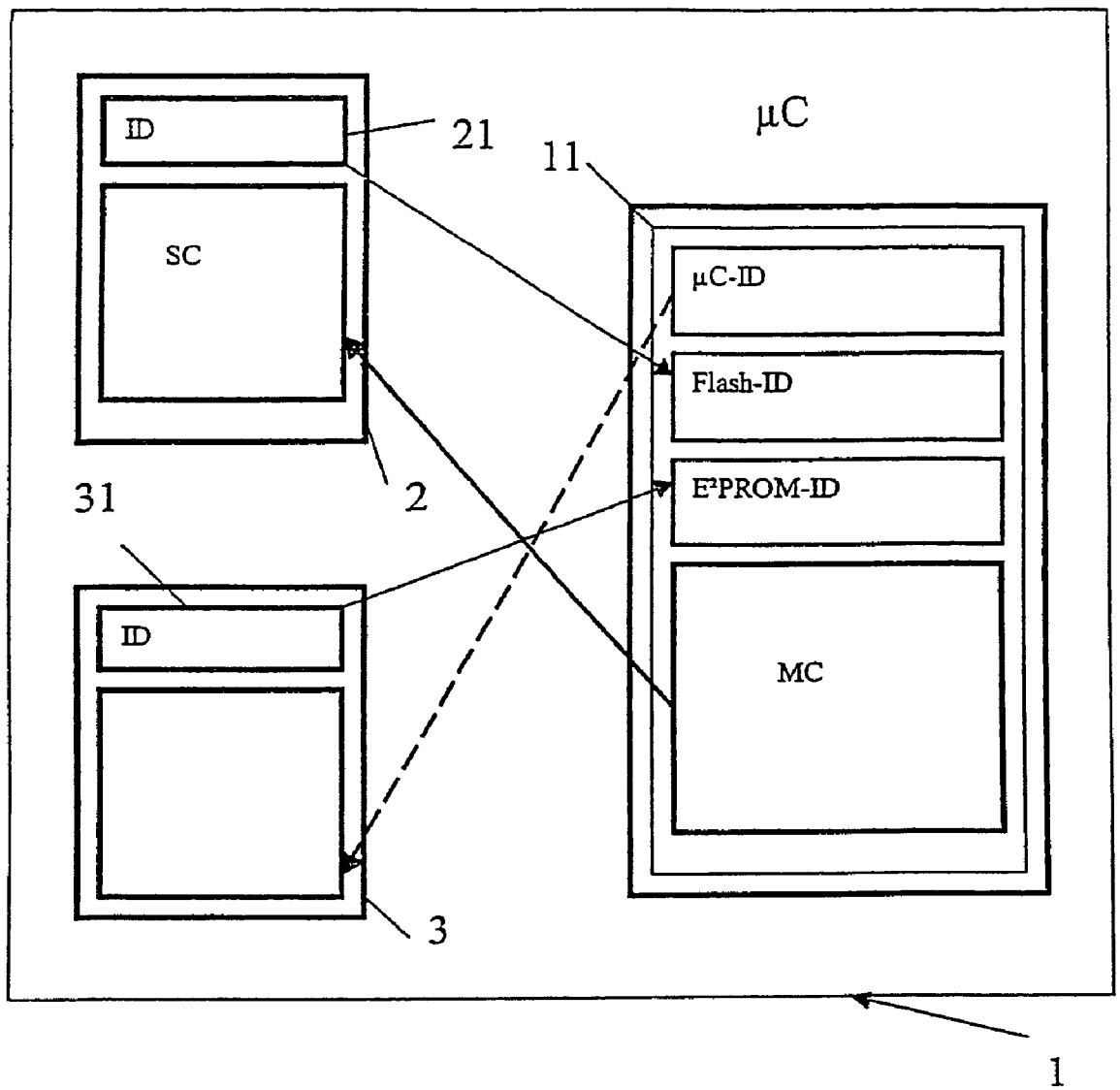
FIG. 2 shows a schematic block diagram of one embodiment of the control device for implementing the process as claimed in the invention.

FIG. 2 shows one embodiment of the control device. The configuration of control devices, such as for example engine control devices, has been known for a long time from the prior art, so that it is detailed only to the extent necessary for the understanding of the invention. The control device 1 in this embodiment comprises a microcomputer μC, a flash memory 2 and an EEPROM (E²PROM) 3. The flash memory 2 and the E²PROM 3 each have an OTP area 21, 31. The latter are preferably configured not to be read-protected. There is also an OTP area 11 in the μC.

The memory modules flash 2, E²PROM 3 in this embodiment are provided with identification numbers ID which are specific to the module. They are generally written at the manufacturer of the module and are stored in the OTP area 21, 21 of the individual modules.

In the process of manufacturing the control device, when the control device is started up for the first time the IDs of the individual memory modules 2, 3 are read out by the microcomputer μC and are stored in the OTP area 11 of the μC which area is writable only once. Starting from this time, operation of the control device 1 is only possible in conjunction with the IDs of the external memory modules 2, 3, which IDs are known to the μC.

With each additional start-up of the control device 1, the μC again reads out the ID of all of the memory modules 2, 3 which are connected to it. In a comparison unit these current IDs may then be compared to the original identifiers which are stored in the OTP area 11 of the μC. If it is established in this comparison that one of the IDs does not agree with one of the original IDs, the control device is prevented from operating or at least the change is diagnosed and optionally displayed.

The code for operating the control device is divided into a master code (MC) and a sub-code (SC). The master code MC contains elementary, essential functionalities for operating the control device, for example the program for generating signals for the actuators (not shown) which are connected to the control device or the program for computing the actuating variables and outputs. The master code MC can furthermore comprise data. In the sub-code SC other programs and data are contained. The control device can only operate using both codes, MC and SC. In the illustrated embodiment the sub-code SC is contained in a rewritable area of the flash memory 2. The master code MC is contained in the OTP area 11 of the microcomputer μC. The master code is preferably protected against read-out via contact-making. This can be achieved either physically by failure of a transistor channel or by circuit engineering. The sub-code SC in contrast to the master code MC can be modified or overwritten. This allows updating of the sub-code or reprogramming.

Furthermore the μC has an identification number μC-ID. It is also stored in the read-protected OTP area of the μC. In the E²PROM additional data for operating the control device are stored in a rewritable area. These data can constitute for example adaptation values and idle rpm.

When the control device is initialized, the microcomputer μC learns the identification numbers which have been stored in the OTP area 21, 31 of the memory modules 2, 3 and which thus cannot be changed, and stores them in the OTP area of the microcomputer μC which can also optionally be configured as read-protected.

From this time on, the memory modules 2, 3 which are connected to the microcomputer are known to the microcomputer μC via their ID.

In addition, the IDs of the memory modules stored in the microcomputer can also be used for encryption of data or programs. Thus the data stored on the E²PROM can be coded for example by a symmetrical encryption process in which the key comprises at least part of the ID of at least one of the memory modules 2, 3. In an engine control device the E²PROM can store for example characteristics, such as learned values, production data, and adaptation values. Basically all symmetrical encryption processes which allow incorporation of an identification which is specific to the control device are suited for encryption. Preferably the data of the E²PROM are encrypted by a key which in addition or as an alternative to the ID of the external memory modules comprises the ID of the microcomputer μC. This results in encryption which is specific to the control device and which makes it impossible to replace the E²PROM or overwrite the data stored on it or prevents operation of the control device after such manipulation. The key is preferably stored in the RAM of the microcomputer μC. In this way the key is generated each time the control device boots up with the incorporation of an identifier which is specific to the control device (for example, the ID of the μC and optionally the IDs of the memory modules) and thus the key is specific to the control device.

Furthermore, the sub-code SC can be stored wholly or partially encrypted on the flash memory 2. For this encryption the ID of the individual memory modules or of the microcomputer or part of this ID can also be integrated into the key. The decryption of the data in the sub-code is done by the master code. Since the latter is stored in a read-protected area of the microcomputer, read-out of the program and thus copying of the software can be prevented.

Monitoring of the sub-code relative to manipulation which is ensured by the μC in the master code can also take place by way of processes other than encryption. Thus, as an alternative or in addition linear/CRC checksum formation or hash value formation can be used. To detect completed manipulation of the data and optionally parts of the sub-code, linear checksums are formed for example over selected areas and the result which has been encrypted as a fingerprint is placed in the sub-code. The master code in control device operation, for example when there is a signal on the terminal 15, over the same predefined area computes the comparison value (for example, linear checksum) and checks it against the decrypted reference value which has been stored encrypted in the sub-code. The type of manipulation detection may be selected arbitrarily.

After detecting manipulation, the master code initiates measures which may lead to control device failure.

Figure 3:
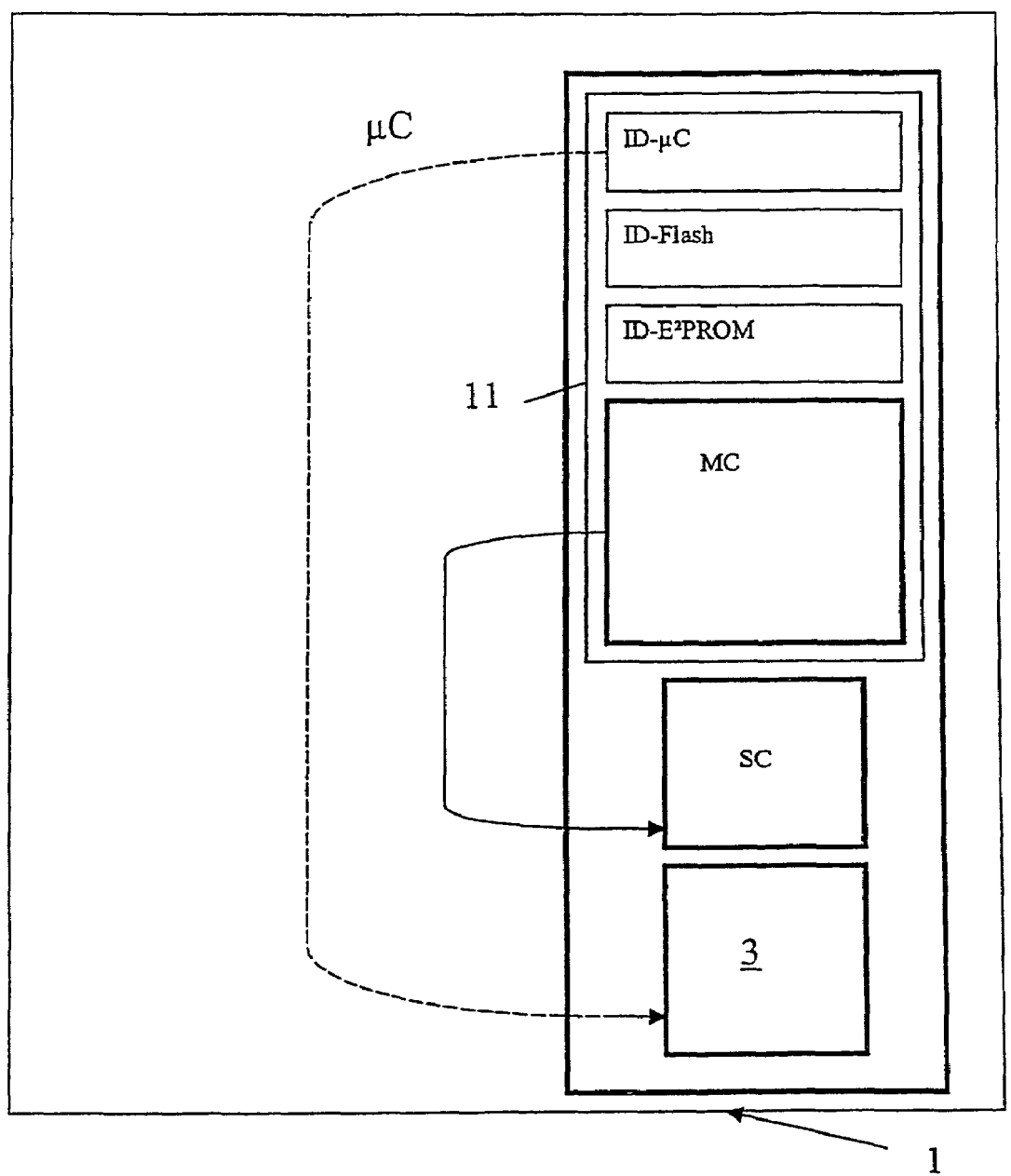
FIG. 3 shows a schematic block diagram of another embodiment of the control device for implementing the process as claimed in the invention.

FIG. 3 shows another embodiment of the control device as claimed in the invention. In this embodiment, the memory modules 2 and 3 are integrated into the microcomputer μC. The μC here has an embedded flash memory, the $E^2PROM$ being emulated. This configuration of the control device does have the advantage that replacement of the memory modules can be reliably prevented, in any case the data in the emulation of the $E^2PROM$ can be overwritten only block by block.

The process for protection against manipulation takes place in this control device with an internal memory essentially analogous to the one described in the foregoing for control devices with external memories. Here in particular the data of the $E^2PROM$ can be stored encrypted and can be decrypted by a key which comprises at least one individual identifier of the control device, such as the μC-ID and/or the flash ID. Likewise the encrypted data or fingerprints contained in the sub-code which is stored in the flash memory of the μC can be decrypted by the master code. In this instance preferably an identifier which is specific to the control device is also integrated in the key.

The invention is not limited to the described embodiments. Thus the identifier of the individual memory modules can be for example the date of manufacture of the control device. This may prevent manipulation during the warranty period.

The control device for the purposes of this invention can constitute for example an engine control device, a transmission control device or a combination instrument.

A large number of advantages can be achieved compared to conventional control devices with the process as claimed in the invention and the control device as claimed in the invention.

With the control device as claimed in the invention, replacement of one or more modules can be reliably prevented since operation of the control device can be prevented by this replacement. It is not possible to read out a part of the program or data which is essential for operation of the control if this part is stored in a read-protected OTP area. Thus copying of the software can be prevented. Access to confidential data via contact-making with the module is not possible either if they are stored in the read-protected OTP area of the μC. The control device can be protected against manipulation especially reliably by its being able to run only in the combination of the master code and sub-code. Changing the sub-code which has been stored in the reprogrammable, optionally external memory, for example the flash memory, without adapting the master code leads to control device failure. Furthermore, data which are stored for example on an $E^2PROM$ can be encrypted in a manner specific to the control device. The decryption of these data can also be made dependent on the identifier of the control device. Additional security can be achieved by the encryption and decryption being made dependent on the combination of the individual modules with the IDs which are known to the μC.

In summary, it can therefore be stated that by the selected encryption of the data of the $E^2PROM$ the manipulation of control devices, such as for example chip tuning in engine control devices, can be reliably prevented.

The invention claimed is:

1. A method for protecting against manipulation of a motor vehicle controller including a microcomputer and at least one memory module(s), said at least one memory module(s) constituting a read-only memory, comprising:
    initially reading out data stored in said read-only memory at start-up of said controller;
    reading out identifiers of said read-only memory and said microcomputer and one of second memories;
    storing said identifiers in said microcomputer;
    generating a key corresponding to said identifiers;
    encrypting said data utilizing said key;
    saving said encrypted data in said read-only memory;
    reading out of said identifiers upon subsequent activation of said controller;
    generating a key from said subsequently read-out identifiers;
    accessing the encrypted data of said read-only memory; and
    decrypting said encrypted data by said subsequently generated key.

2. A method according to claim 1 wherein one of said identifiers comprises the identifier of the microcomputer.

3. A method according to claim 1 wherein one of said identifiers comprises the identifier of an additional memory module of the computer.

4. A method according to claim 1 wherein said key is stored in a RAM of said computer.

5. A method according to claim 1 including reading out at least part of one of said identifiers of at least one of the modules of the control device to generate for encryption of data on a reversible read-only memory from a read-protected area of said microcomputer.

6. A method according to claim 5 including regenerating a key for decryption of the data stored encrypted in the reversible read-only memory upon subsequent start up of the controller.

7. In a motor vehicle controller including a microcomputer and at least one memory module(s), said at least one memory module(s) constituting a read-only memory, a system for protecting against manipulation of said controller comprising:
    means for initially reading out data stored in said read-only memory at start-up of said controller;
    means for reading out identifiers of said read-only memory and said microcomputer and one of second memories;
    means for storing said identifiers in said microcomputer;
    means generating a key corresponding to said identifiers;
    means for encrypting said data utilizing said key;
    means for saving said encrypted data in said read-only memory;
    means for reading out said identifiers upon subsequent activation of said controller;
    means for generating a key from said subsequently read-out identifiers;
    means for accessing the encrypted data of said read-only memory; and
    means for decrypting said encrypted data by said subsequently generated key.

* * * * *

UNITED STATES PATENT AND TRADEMARK OFFICE
CERTIFICATE OF CORRECTION

PATENT NO. : 7,565,552 B2
APPLICATION NO. : 10/525213
DATED : July 21, 2009
INVENTOR(S) : Feilen et al.

It is certified that error appears in the above-identified patent and that said Letters Patent is hereby corrected as shown below:

Title Page, above "(*) Notice" insert -- (73) Assignee: Audi AG --

Signed and Sealed this
Thirty-first Day of January, 2012

David J. Kappos
*Director of the United States Patent and Trademark Office*